Dec. 17, 1957  P. KLAMP  2,816,643
WORK HANDLING CONVEYOR STRUCTURE
Filed July 13, 1953  8 Sheets-Sheet 1
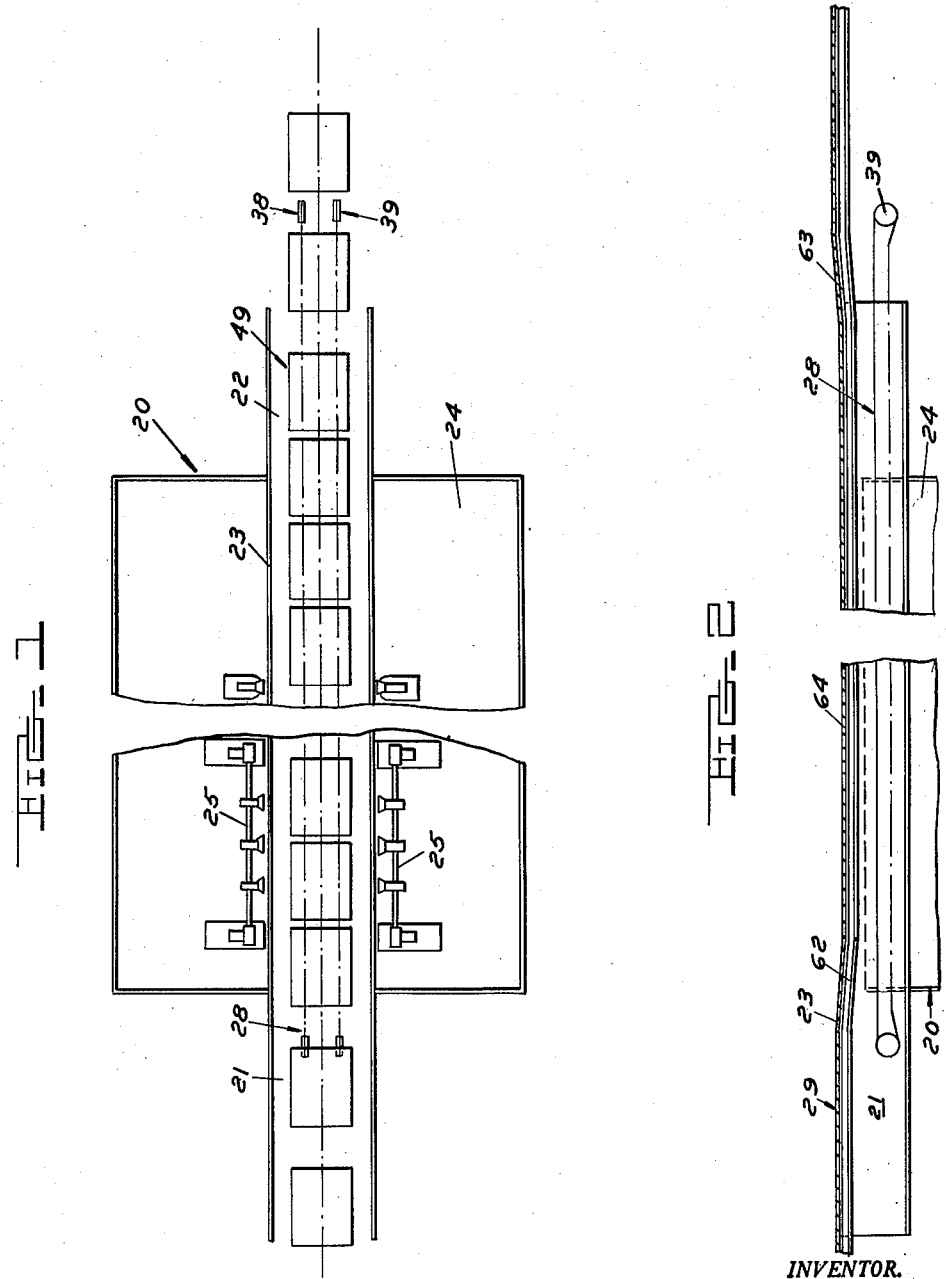
INVENTOR.
PAUL KLAMP
BY
ATTORNEYS

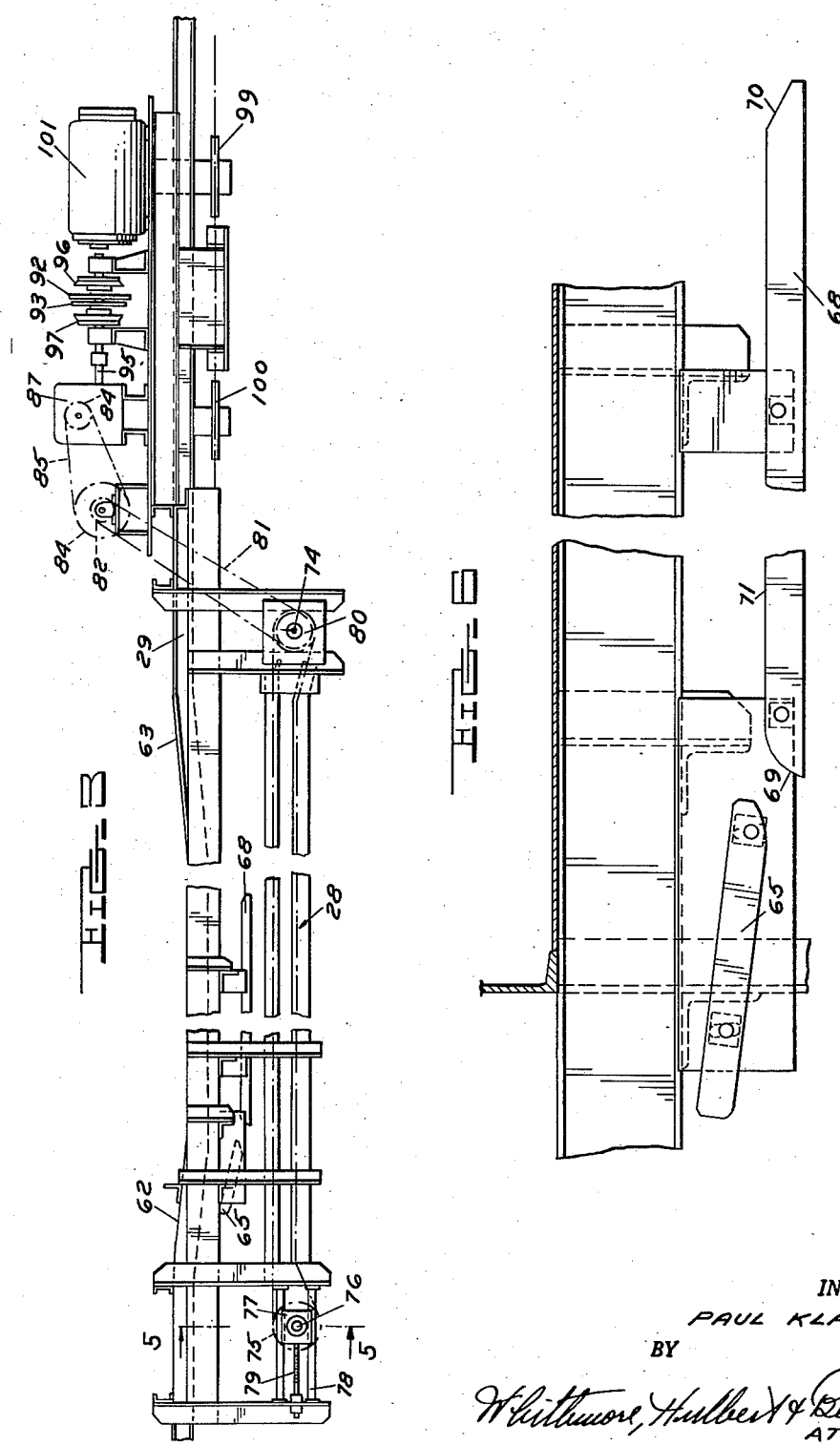

Dec. 17, 1957            P. KLAMP            2,816,643
WORK HANDLING CONVEYOR STRUCTURE
Filed July 13, 1953            8 Sheets-Sheet 3
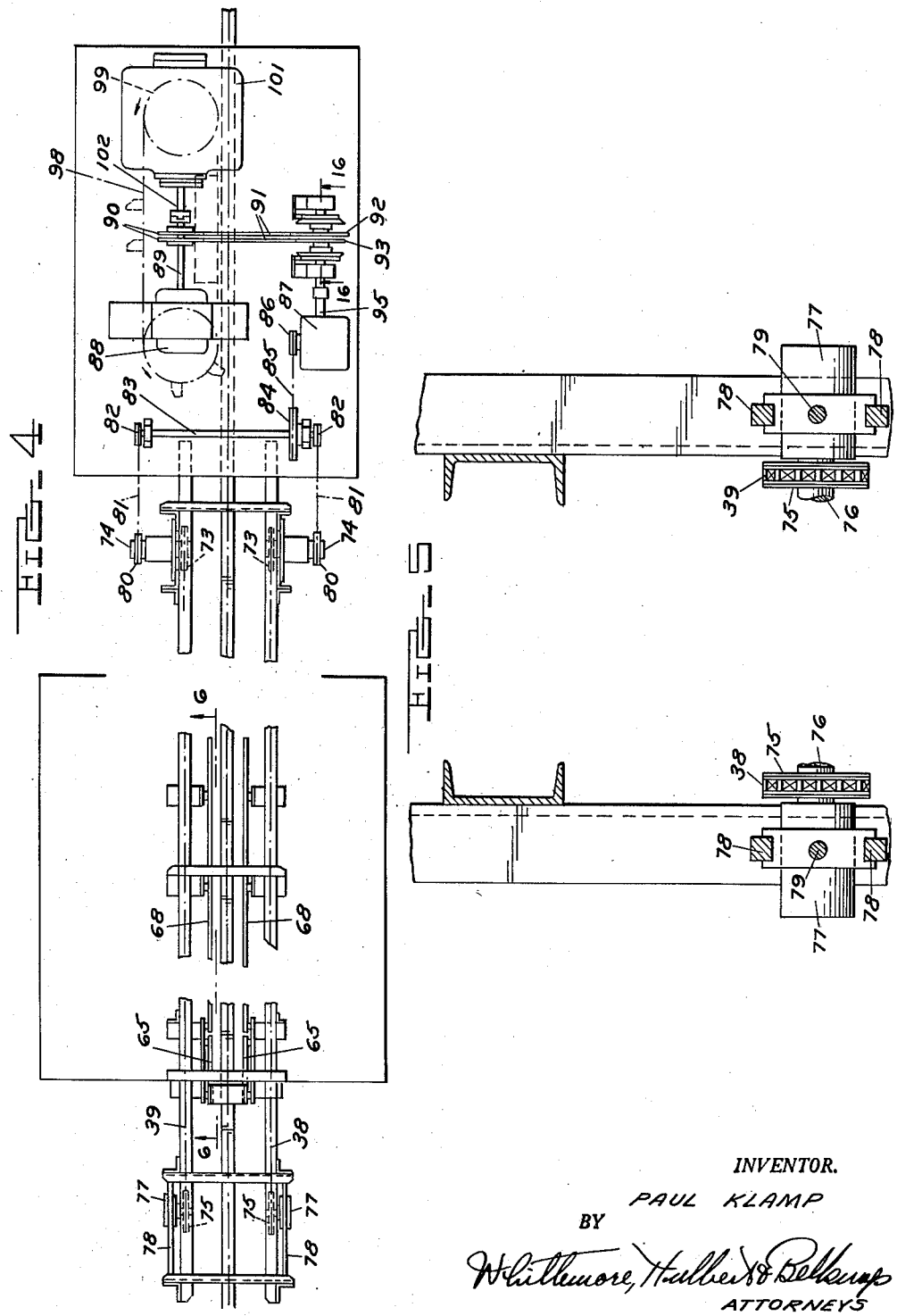
INVENTOR.
PAUL KLAMP
BY
ATTORNEYS

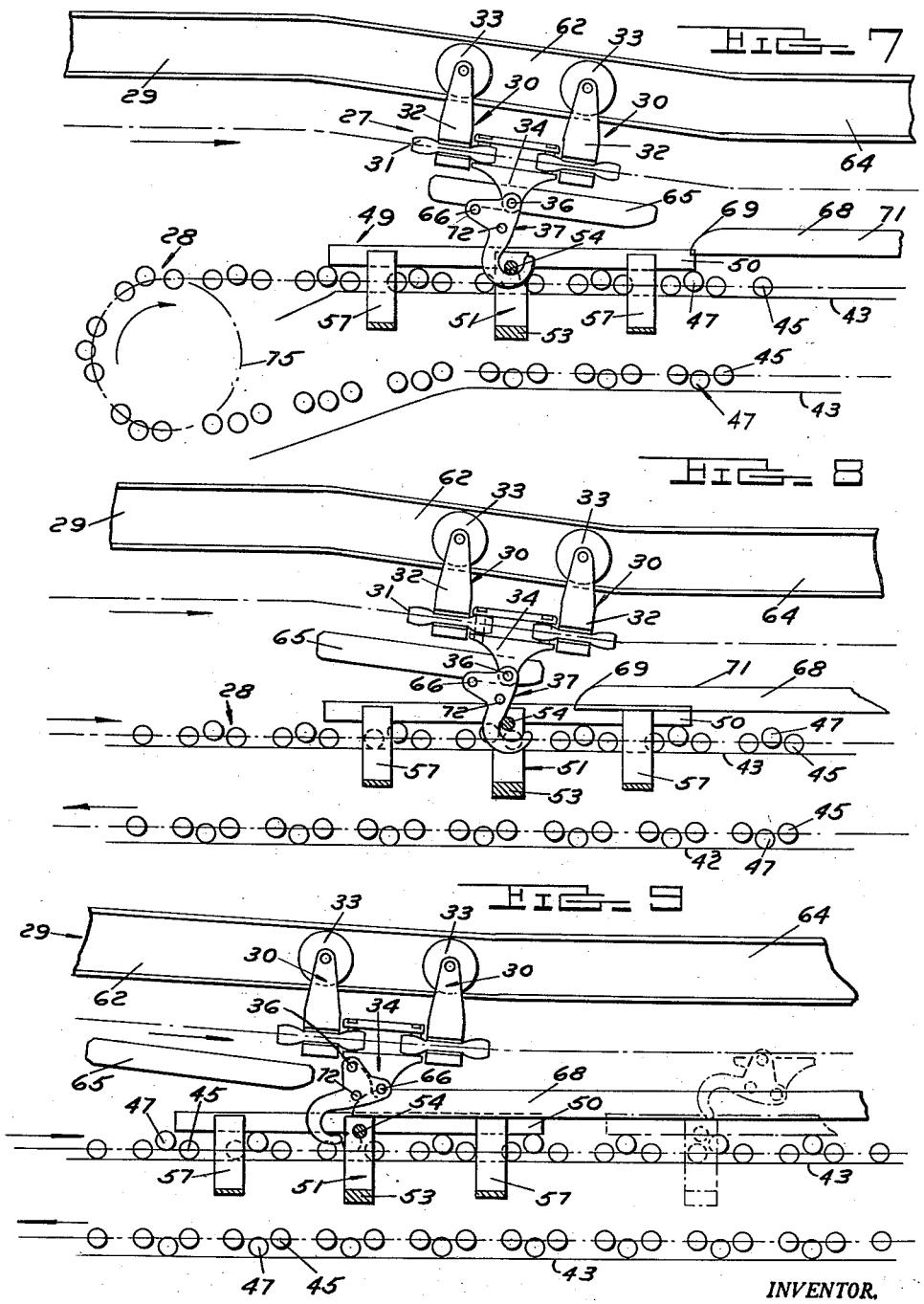

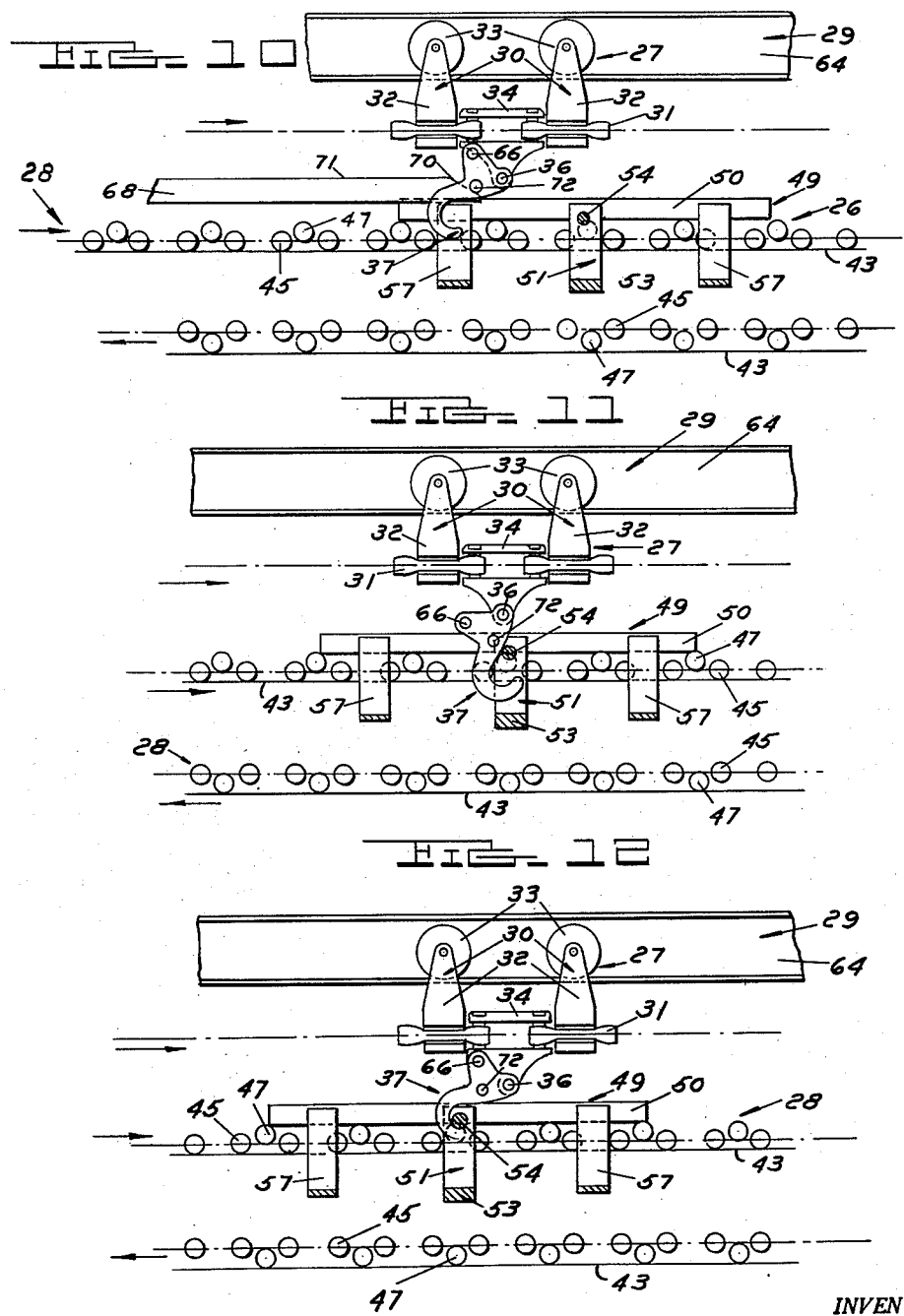

Dec. 17, 1957 P. KLAMP 2,816,643
WORK HANDLING CONVEYOR STRUCTURE
Filed July 13, 1953 8 Sheets-Sheet 6

INVENTOR.
PAUL KLAMP
BY
Whittemore, Hulbert & Belknap
ATTORNEYS

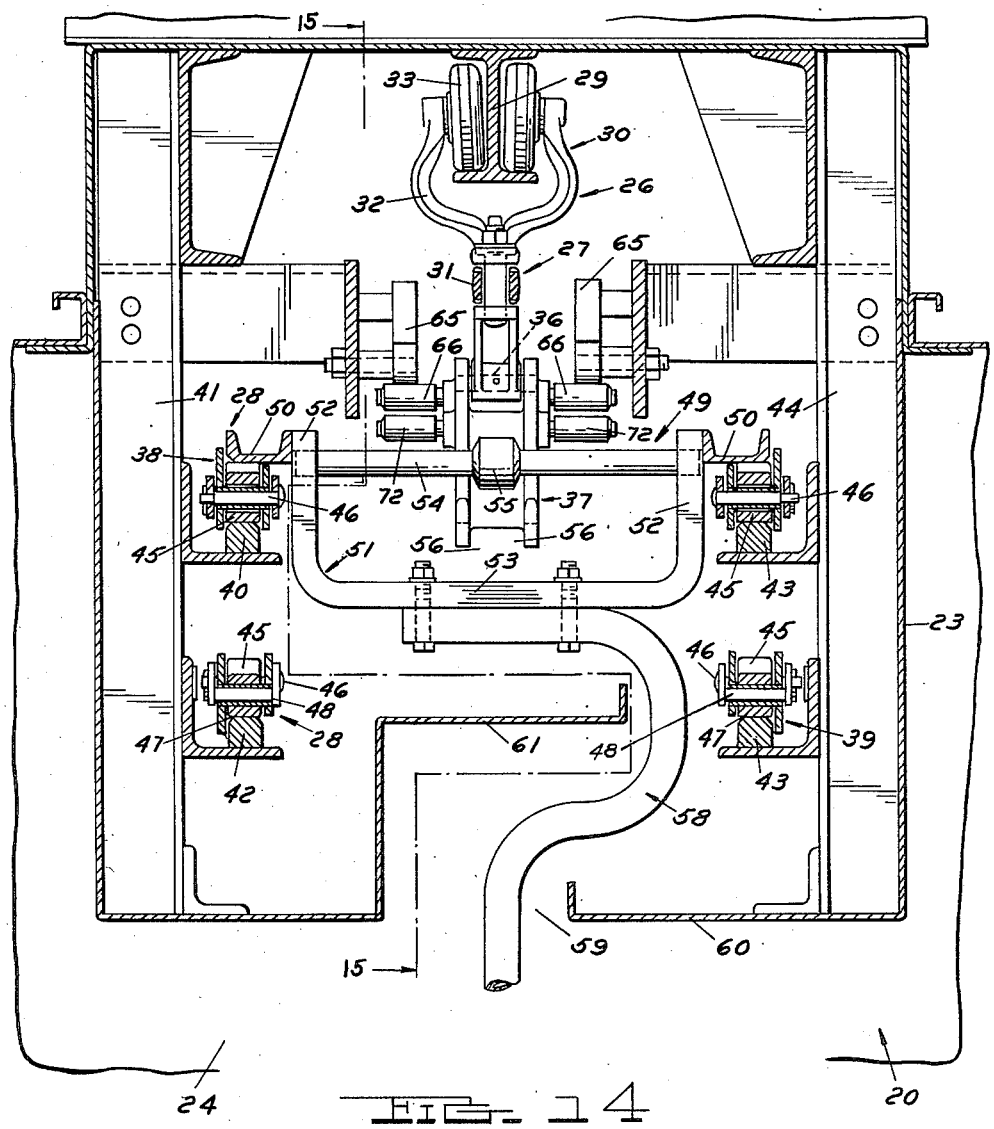

Dec. 17, 1957 P. KLAMP 2,816,643
WORK HANDLING CONVEYOR STRUCTURE
Filed July 13, 1953 8 Sheets-Sheet 8

INVENTOR.
PAUL KLAMP
BY
Whittemore, Hulbert & Belknap
ATTORNEYS

United States Patent Office 2,816,643
Patented Dec. 17, 1957

2,816,643

WORK HANDLING CONVEYOR STRUCTURE

Paul Klamp, Detroit, Mich., assignor to Mechanical Handling Systems, Inc., Detroit, Mich., a corporation of Michigan Application July 13, 1953, Serial No. 367,437

15 Claims. (Cl. 198—20)

This invention relates generally to work handling apparatus and refers more particularly to an improved conveyor system.

It is an object of this invention to provide a conveyor system rendering it possible to transfer work from a first conveyor to a second conveyor and then back to the first conveyor without interrupting advancement of either conveyor or without manually handling the parts.

It is another object of this invention to provide a conveyor system of the above type wherein the first conveyor is spaced above the second conveyor and wherein the second conveyor travels at a rate of speed less than the first conveyor so that the spacing between adjacent work pieces transferred to the second conveyor is materially reduced. The foregoing renders it possible to provide the spacing of the work pieces on the first conveyor required for conveying the work pieces along a predetermined circuitous path of travel and, at the same time, permits bunching the work pieces while the latter are propelled through a preselected zone by the second conveyor. Such an arrangement is especially suitable in installations where the work pieces are advanced through a paint spraying booth, since it permits painting the maximum number of work pieces within a booth of given length and, in addition, contributes materially to reducing the loss of paint. In other words, bunching of the work pieces being advanced through the paint spraying booth reduces the space between adjacent work pieces and hence provides less space through which paint may escape. Moreover, the above structure permits advancing the work pieces through the paint spraying booth at a rate found most suitable for the efficient application of paint on the work pieces.

The foregoing as well as other objects will be made more apparent as this description proceeds especially when considered in connection with the accompanying drawings, wherein:

Figure 1 is a diagrammatic plan view partly broken away of work handling apparatus embodying the features of this invention;

Figure 2 is a diagrammatic side elevational view partly in section of the structure shown in Figure 1;

Figure 3 is a fragmentary side elevational view of the work handling apparatus;

Figure 4 is a fragmentary plan view of the structure shown in Figure 3;

Figure 5 is a cross sectional view taken on the line 5—5 of Figure 3;

Figure 6 is a longitudinal sectional view taken on the line 6—6 of Figure 4;

Figure 16:
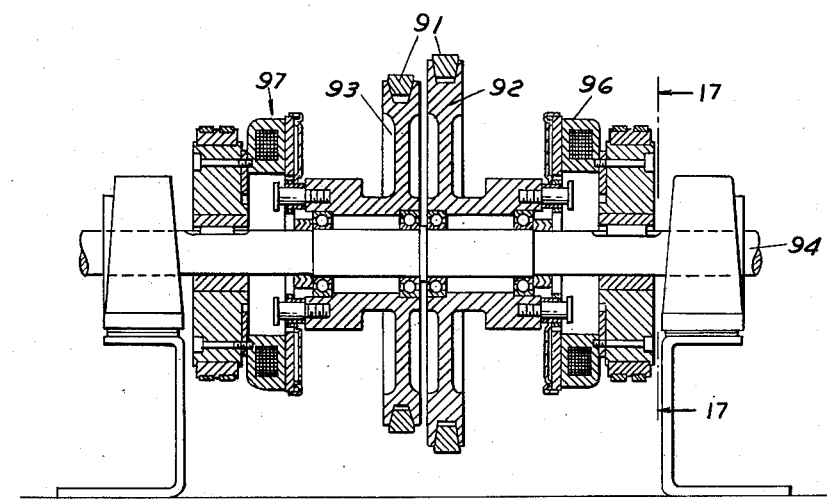
Figure 15:
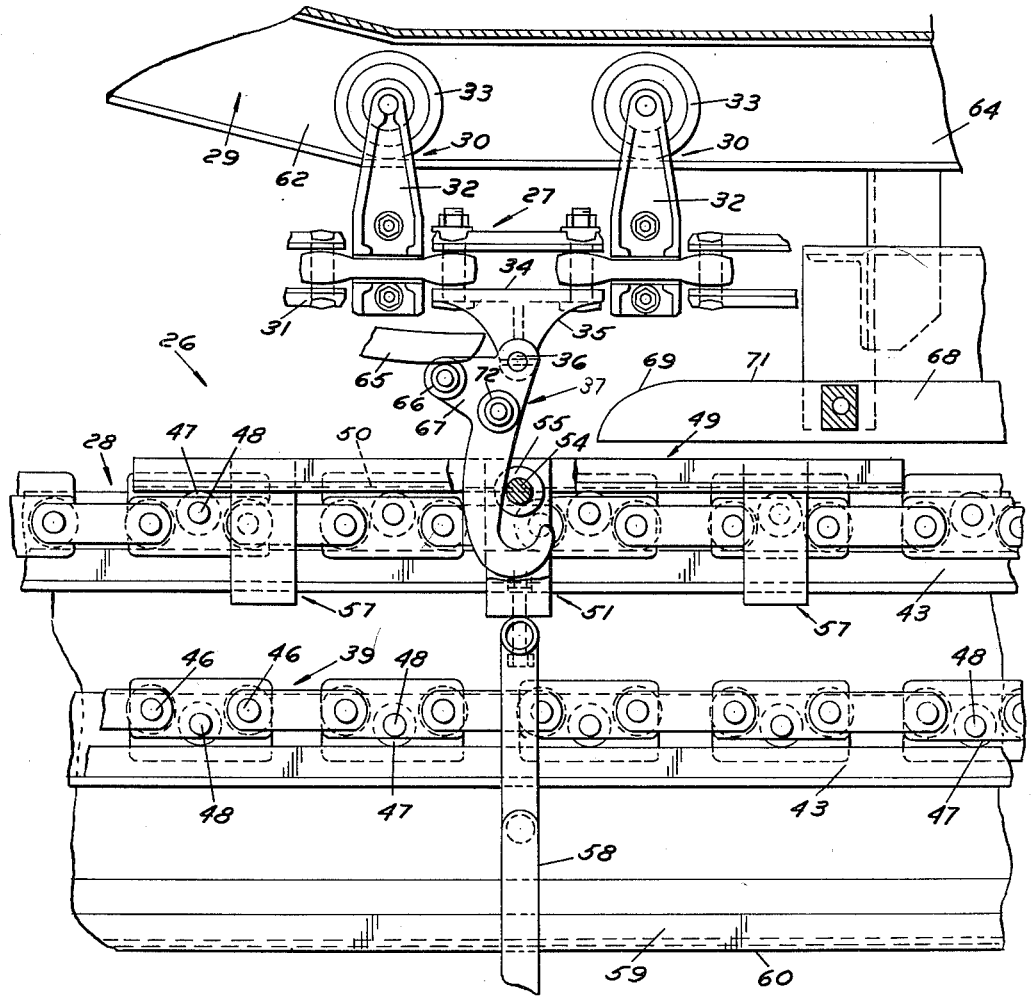

Figures 7–13 inclusive are respectively fragmentary semi-diagrammatic side elevational views showing different positions of the relative parts of the apparatus;

Figure 14 is a cross sectional view through part of the work handling apparatus;

Figure 15 is a sectional view taken substantially on the line 15—15 of Figure 14;

Figure 16 is a sectional view taken on the line 16—16 of Figure 4; and

Figure 17:
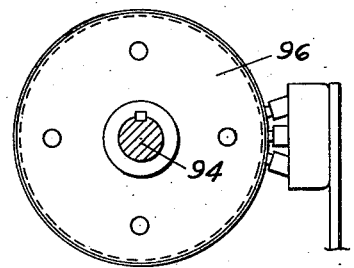

Figure 17 is a cross sectional view taken on the line 17—17 of Figure 16.

In the specific example selected herein for the purpose of illustration, the work pieces are advanced through a paint spraying booth and are conveyed to and from said booth by a main conveyor having work holders for respectively suspending the work pieces from the main conveyor in proper spaced relationship.

The spacing between adjacent work pieces on the main conveyor must be sufficient to enable movement of the conveyor throughout its selected path of travel without the danger of adjacent work pieces striking one another when the course of the conveyor turns either horizontally or vertically. This required spacing of the work pieces is not conducive to efficient paint spraying of the work pieces as the latter are advanced through the spray booth because a considerable amount of paint passes through the space between adjacent work pieces. Moreover, the rate of travel of the main conveyor is frequently considerably higher than the optimum speed of travel for efficient paint spraying in a booth of limited length. One solution of this problem is of course, to reduce the rate of travel of the main conveyor but this is objectionable for a number of reasons among which are: (1) it would greatly increase the time required for the work to travel throughout its intended path of travel; (2) it would require an exceptionally long spray booth; and (3) it would result in considerable loss of paint due to the clearance space required between adjacent work pieces.

It follows from the foregoing that it is desirable to not only reduce the spacing between adjacent work pieces passing through the spray booth to a minimum but in addition to reduce the speed of advancement of the work pieces as the latter are advanced through the spray booth. This is accomplished herein without interfering with the optimum speed of travel of the main conveyor by transferring the work pieces from the main conveyor to a second conveyor positioned directly below the main conveyor. The second conveyor is driven at a reduced rate of speed in comparison to the main conveyor and, after the work pieces leave the paint spraying zone, provision is made for returning the work pieces to the main conveyor so that continued advancement of the work pieces is accomplished at the increased speed of the main conveyor. The reduced rate of speed of the second conveyor is so determined that adjacent work pieces assume a relatively close proximity to one another while they pass through the paint spraying booth.

With the above in view, reference is made more in detail to Figures 1 and 2 of the drawings wherein the numeral 20 indicates a paint spraying booth having an entrant end 21 and a delivery end 22. As shown in Figures 2 and 14 of the drawings, the booth 20 has a section 23 at the top through which the conveyor system passes and has a paint spraying zone 24 located below the section 23. Suitably supported in the zone 24 of the booth 20 are two banks 25 of paint spraying devices which are respectively located at opposite sides of the path of travel of the work pieces being conveyed through the booth.

As shown in Figures 7 to 15 inclusive, it will be noted that the work pieces are advanced by a conveyor system 26 comprising a main conveyor 27 and a secondary conveyor 28. The main conveyor 27 is of the trolley type comprising a track or rail 29 and a plurality of trolleys 30. The rail 29 is I-shaped in cross section and extends throughout a predetermined path of travel which includes the section 23 of the spray booth 20.

The trolleys 30 are spaced from each other lengthwise of the rail 29 and are propelled along the rail 29 by a link type chain 31 which also forms a part of the conveyor 27. The chain 31 may be of any suitable construction and is supported by the trolleys 30 directly below the rail 29. It will be noted from Figure 15 of the drawings that the trolleys 30 are arranged in pairs with the trolleys of each pair spaced from each other in the direction of length of the rail 29. Briefly, each trolley comprises a yoke 32 having the lower end suitably secured to the chain 31 and having portions at the upper end extending along opposite sides of the rail 29. The upper portions of the yokes respectively rotatably support wheels 33 which have a rolling engagement with the bottom flanges of the rail 29 at opposite sides of the web portion of said rail.

Clamped to the chain 31 between each pair of trolleys 30 is a bracket 34 having a portion 35 extending downwardly from the chain and having a pin 36 extending through the portion 35 with its axis perpendicular to the path of travel of the chain 31. The opposite ends of the pin 36 project axially beyond opposite sides of the bracket 34 and a hook 37 is pivoted on the pin 36. The upper end of the hook 37 has laterally spaced ears respectively positioned at opposite sides of the bracket portion 35 and apertured to receive the opposite ends of the pin 36. The hook is arranged so that the hook portion at the lower end faces the direction of travel of the chain 31 or in other words faces forwardly, as shown in Figure 15 of the drawings. It follows from the above that the hooks 37 are not only advanced along the rail 29 by the chain 31 but are also supported on the chain 31 for swinging movement about an axis perpendicular to the chain 31.

The secondary conveyor 28 is spaced below the conveyor 27 and extends parallel with the conveyor 27 through the spray booth 20. The conveyor 28 is merely of sufficient length to advance the work pieces through the paint spraying booth 20 and in the present instance comprises two endless chains 38 and 39 which are identical in construction. The chains 38 and 39 are arranged in the section 23 of the spray booth 20 at opposite sides of the conveyor 27. The top run of the chain 38 is supported on a horizontal track 40 which in turn is secured to frame structure 41 at one side of the section 23 of the spray booth 20, and the lower run of the chain 38 is supported on a track 42 which is also secured to the frame structure 41 directly below the track 40. The top and bottom runs of the chain 39 are respectively supported by horizontally extending tracks 43 secured to frame structure 44 at the opposite side of the section 23 of the paint spraying booth 20. Both chains 38 and 39 are of the link type and rollers 45 are respectively mounted on the pivot pins 46 of the chain in a manner to have a rolling engagement with the top tracks 40, 43. The bottom tracks 42, 43 are respectively engaged by rollers 47 which are supported on pins 48 respectively located between the pivot pins 46. The rollers 47 are offset laterally with respect to the rollers 45 in a direction such that the rollers 47 on the top runs of the chains are spaced above the adjacent rollers 45 for engagement with suitable work supports to be presently described, and the rollers 47 on the bottom runs of the chains are spaced below adjacent rollers 45 in order to have a rolling engagement with the tracks 42, 43.

The above arrangement is such that the hooks 37 are advanced by the top or main conveyor 27 between the chains 38 and 39 of the conveyor 28, as clearly shown in Figure 14 of the drawings. In use, each hook 37 supports a work holder 49 comprising laterally spaced rails 50 extending in the general direction of length of the conveyor 27 and poistioned to respectively engage the top runs of the chains 38 and 39. The rails 50 are connected intermediate the ends thereof by an upwardly opening U-shaped brace 51 having the upper ends of the leg portions 52 welded or otherwise permanently secured to the inner sides of the rails 50 and having the base portion 53 spaced below the lower ends of the hooks 37. The leg portions 52 of the cross braces 51 are respectively connected together at the upper ends by cross shafts 54 having enlargements 55 intermediate the ends thereof. The cross shafts 54 are respectively engaged by the hooks 37 to suspend the work holders 49 from the conveyor 27 and the hooks have shoulders 56 respectively engageable with opposite ends of the enlargement 55 to hold the work supports 49 against lateral displacement relative to the conveyor 27.

As shown in Figures 7–13 inclusive and 15, the opposite ends of the side rails 50 on the work holders 49 are also connected together by U-shaped braces 57. The braces 57 are similar to the brace 51 in that the upper ends of the leg portions are respectively secured to the side rails 50 and in that the base portions are spaced below the path of travel of the hooks 37. Referring now to Figure 14 of the drawings, it will be noted that a hanger 58 is secured to the U-shaped brace 51 of each work holder 49. In the present instance, the hangers 58 are respectively secured to the base portion 53 of the cross braces 51 on the respective work holders 49 and project downwardly between the lower runs of the chains 38 and 39 through a clearance opening 59 formed in the bottom wall 60 of the top section 23 of the paint spraying booth 20. The lower ends of the hangers 58 are not shown herein but may be provided with the usual swivel coupling for engagement with a work piece, not shown herein. It is to be understood, however, that the length of the hangers 58 is such as to position the work pieces within the lower portion of the spray booth 20 between the banks 25 of the paint spraying equipment shown in Figure 1 of the drawings. Referring again to Figure 14 of the drawings, it will be noted that the clearance opening 59 is shielded by a plate 61 which forms a part of the bottom wall 60 of the section 23 and overlies the opening 59 above the latter. The upper ends portions of the hangers 58 are shaped to extend around the free edge of the plate 61 and to project downwardly through the clearance opening 59. The purpose of the shield 61 is to prevent the escape of lubricant dripping from the conveyors into the paint spraying section 24 of the booth 20.

As shown in Figure 2 of the drawings, the rail 29 of the conveyor 27 has a downwardly inclined section 62 at the entrant end 21 of the spray booth 20 and has an upwardly inclined section 63 at the delivery end 22 of the spray booth 20. The inclined sections are connected together by an intermediate section 64 which is located at a lower elevation than the remaining length of the rail 29 and extends parallel to the conveyor 28. The arrangement is such that the trolleys 30 moving along the rail 29 are lowered by the section 62 of the rail sufficiently to deposit the associated work holder 49 on the conveyor 28 (Figure 7) and to also lower the adjacent hook 37 relative to the shaft 54 after the work holder 49 is deposited on the conveyor 28, as shown in Figure 15 of the drawings.

As a result of the above construction, the hooks 37 are lowered sufficiently to enable releasing the same from the shafts 54 by merely swinging the hooks rearwardly about the pivot pins 36. In this connection, it is important to note that the conveyor 28 is driven at a speed less than the conveyor 27 so that the hooks 37 are actually moved forwardly relative to the shafts 54 after the work holders 49 are deposited on the conveyor 28. This relative forward movement of the hooks 37 swings the lower ends of the hooks rearwardly (Figure 8) and this swinging movement is controlled by a pair of cam rails 65 shown in Figures 14 and 15 of the drawings as secured to the frame structure 41, 44 at opposite sides of the path of travel of the chain 31.

The rails 65 extend parallel to the path of travel of the chain 31 and the bottom surfaces are inclined upwardly in a rearward direction as shown in Figures 6–9 inclusive of the drawings. The cam rails 65 are respectively engaged by rollers 66 mounted on rearward extensions 67 of the hooks 37 and projecting laterally from opposite sides of the hooks. The arrangement is such that the cams 65 guide upward swinging movement of the hooks 37 resulting from forward movement of the hooks relative to the conveyor 28.

In Figure 15 of the drawings a work carrier 49 is shown as resting on the conveyor 28 which is being moved at a slower rate of speed than the conveyor 27, and the work carrier 49 is being advanced at the higher rate of speed of the conveyor 27 by the hook 37. Thus, the carrier 49 tends to swing the hook 37 backwardly or in a direction to frictionally engage the rollers 66 on the hook 37 against the undersides of the respective rails 65. As stated above the undersides of the rails 65 are inclined gradually in an upward direction in order to definitely control the rate at which the hook 37 may be swung backwardly by the work carrier 49. This control is advantageous since it enables reducing the speed of the work carrier 49 gradually to the speed of the conveyor 28 and prevents undue swinging of the work suspended from the carriers 49.

Referring now to Figures 9 and 15 of the drawings, it will be noted that as the hooks 37 are released from the cam rails 65, the hooks are positively swung upwardly out of the path of travel of the shafts 54 by a pair of cams 68. As shown in Figures 6 and 15 of the drawings, the cams 68 are respectively secured to the frame structure 41, 44 at opposite sides of the path of travel of the conveyor chain 31 and extend substantially parallel to the path of travel of the conveyor 28 for substantially the full length of the top run of the conveyor 28. More accurately the cam rails 68 extend from a position adjacent the forward ends of the cams 65 to positions adjacent the rear end of the conveyor 28. The rear ends of the cam rails 68 are curved upwardly in a forward direction to provide cam surfaces 69 and the front ends of the cams 68 are inclined in a downward direction to provide cam surfaces 70. The cam surfaces 69 and 70 of the cam rails 68 are connected by horizontal extending cam surfaces 71.

Figure 13:
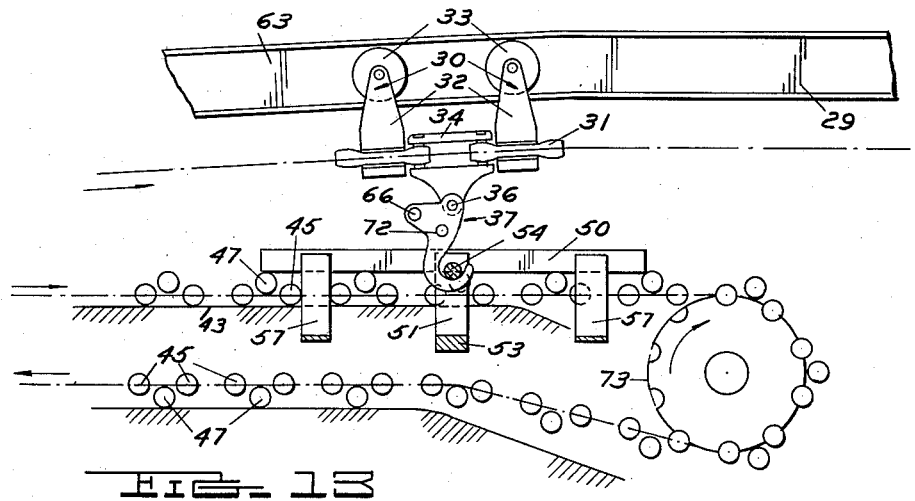

The cam rails 68 are respectively engaged by rollers 72 respectively supported on the hooks 37 and projecting laterally outwardly from opposite sides of the hooks. The arrangement is such that after the rollers 66 on the hooks 37 are advanced beyond the front ends of the cam rails 65, the rollers 72 respectively engage the cam surfaces 69 on the cam rails 68 (Figure 9) and hence the hooks are positively swung upwardly to positions wherein the lower ends of the hooks are spaced above the path of travel of the shafts 54, as shown by the broken lines in Figure 9 of the drawings. During continued advancement of the hooks 37 relative to the conveyor 28, the rollers 72 pass along the horizontal cam surfaces 71 of the cam rails 68 until the rollers contact the downwardly inclined cam surfaces 70 at the front ends of the cam rails 68, as shown in Figure 10 of the drawings. The cam surfaces 70 permit downward swinging movement of the hooks 37 to a position wherein the lower ends of the hooks are again located in the path of travel of the shafts 54 so that continued movement of the hooks relative to the conveyor 28 causes the hooks to again engage the shafts 54, as shown in Figures 11 and 12 of the drawings. At or about the same time that the hooks 37 are re-engaged with the shafts 54, the trolleys carrying the hooks engage the upwardly inclined section 63 of the rail 29 so that the hooks 37 are again raised to the normal elevation of the rail 29 and the work holders are lifted from the conveyor 28, as shown in Figure 13 of the drawings.

Inasmuch as the conveyor 28 is driven at a speed slower than the conveyor 27, it follows that the work holders transferred from the conveyor 27 to the conveyor 28 assume positions on the latter conveyor in closer relationship and the distance between the work pieces suspended from adjacent work holders on the conveyor 28 is determined by the differential speeds of the conveyors.

In practice this differential speed is controlled so that a minimum clearance is provided between adjacent work pieces during the interval the latter are advanced by the conveyor 28 through the paint spraying booth 20.

With the above in view, reference is now made more in detail to the mechanism for driving the conveyors. The chains 38 and 39 of the conveyor 28 have the front ends extending around sprockets 73 respectively secured to shafts 74 suitably mounted on the frame structure of the conveyor system. The rear ends of the conveyor chains are respectively extended around sprockets 75 respectively mounted on shafts 76 which in turn are supported in journals 77. As shown in Figures 3–5 inclusive of the drawings, the journals 77 are respectively mounted on rails 78 for sliding movement in the direction of length of the conveyor 28. Suitable screws 79 are connected to the journals 77 for adjusting the position of the journals relative to the rails 78, and thereby serve as a chain tightener.

The sprockets 73 are driven and for this purpose sprockets 80 are respectively secured to the outer ends of the shafts 74. The sprockets 80 are connected by chains 81 to sprockets 82 which in turn are mounted on a counter shaft 83. The counter shaft 83 has a sprocket 84 secured thereto and this sprocket is connected by a chain 85 to a sprocket 86 secured to the output shaft of a speed reducer 87.

The speed reducer 87 is driven by an electric motor 88 having a drive shaft 89 and having a pair of driving pulleys 90 secured to the drive shaft 89. The pulleys 90 are respectively connected by belts 91 to pulleys 92 and 93. As shown in Figure 16 of the drawings, the pulleys 92 and 93 are freely rotatably supported on a shaft 94 which is journaled on the frame structure in axial alignment with the input shaft 95 of the speed reducer 87 and is coupled to the shaft 95.

The pulleys 92 and 93 are selectively connected to the shaft 94 by magnetic clutches 96 and 97. These clutches may be of any conventional type and hence are not shown or described in detail herein. It will suffice to point out that operation of the clutch 96 connects the pulley 92 to the shaft 94 and operation of the clutch 97 connects the pulley 93 to the shaft 94. The pulleys are of differential diameter so that the conveyor 28 may be driven at different speeds.

The conveyor chain 31 is driven in the usual manner by an endless chain 98 (Figures 3 and 4) having a driving sprocket 99 at the front end and having an idler sprocket 100 at the rear end. The driving sprocket 99 is connected to the output shaft of a speed reducer 101 having the power input shaft 102 coupled to the motor shaft 89 so that the same motor is used for driving both conveyors.

It will be noted from the foregoing that since the hooks 37 are spaced fixed distances from one another and since the common drive for both conveyors 27 and 28 assures a fixed relationship between the speeds of the latter conveyors, the spacing between adjacent carriers 49 on the conveyor 28 is definitely controlled. It is also important to note that the foregoing construction enables the speed of the work carriers to be reduced from or increased to the speed of the main conveyor 27, regardless of the speed of the work carriers advancing through the "bunching zone." Such an arrangement provides an infinitely durable adjustment of the spacing between adjacent work carriers on the conveyor 28. Another feature of the above structure is that it permits placing a work carrier on the bunching conveyor 28 before actually releasing it from the main conveyor 27 and also enables raising the work carrier from the bunching conveyor 28 after the carrier is connected to the main conveyor 27. Thus, there are no transfer difficulties at either end of the bunching conveyor 28 which would interfere with proper spacing of the work carriers.

What I claim as my invention is:

1. Work handling apparatus comprising a first conveyor movable along a predetermined path of travel, hooks depending from the conveyor at points spaced from each other lengthwise of the conveyor and facing the direction of advancement of the conveyor, means respectively pivotally mounting the upper ends of the hooks on the conveyor for swinging movement about axes extending transversely of the path of travel of the conveyor, work holders having parts respectively engageable by the hooks, a second conveyor supported below the first conveyor for movement along a path of travel which extends in the same general direction as the path of travel of the first conveyor and having supporting rollers, a guide for the first conveyor and having means for directing the first conveyor downwardly toward the second conveyor to deposit the work holders on the rollers of the second conveyor and to lower the hooks relative to the work holders, means for driving said first conveyor and for driving the second conveyor at a rate slower than the first conveyor to reduce the spacing between adjacent work holders on the second conveyor and to swing said hooks rearwardly about their pivots, and means for controlling the rate of deceleration of the work holders as they are deposited on the second conveyor.

2. The structure defined in claim 1 wherein the means for controlling deceleration of the work holders comprises a cam positioned for engagement by the hooks as the latter are swung rearwardly relative to the work holders and having a cam surface shaped to reduce the rate of rearward swinging movement of the hooks.

3. Work handling apparatus comprising a first conveyor movable along a predetermined path of travel, hooks depending from the conveyor at points spaced from each other lengthwise of the conveyor and facing the direction of advancement of the conveyor, means respectively pivotally mounting the upper ends of the hooks on the conveyor for swinging movement about axes extending transversely of the path of travel of the conveyor, work holders having parts respectively engageable by the hooks, a second conveyor supported below the first conveyor for movement along a path of travel which extends in the same general direction as the path of travel of the first conveyor and having anti-friction means for supporting said work holders, guide means for relatively moving said conveyors toward each other to deposit said work holders on the anti-friction means of said second conveyor and to lower said hooks relative to said work holders, means for driving said first conveyor and for driving said second conveyor at a rate of speed slower than said first conveyor to reduce the spacing between adjacent work holders on the anti-friction means of said second conveyor and to swing said hooks rearwardly about their pivots, and means for controlling the rate of deceleration of said work holders as they are deposited on the anti-friction means of said second conveyor.

4. The work handling apparatus defined in claim 3 comprising means responsive to continued advancement of said hooks by said first conveyor beyond said controlling means for swinging said hooks further in a rearward direction completely out of engagement with said parts of said holders to thereby release said holders from said first conveyor.

5. In combination with a spray booth having spray equipment therein, a first conveyor movable along a path extending through said booth at the top of the latter, a second conveyor supported in said booth below said first conveyor and movable in the direction of movement of said first conveyor, hooks depending from said first conveyor at points spaced from each other lengthwise of said first conveyor and facing the direction of movement of the latter, means respectively pivotally mounting the upper ends of said hooks on said first conveyor for swinging movement about axes extending transversely of the path of travel of said first conveyor, work holders having parts respectively engageable by said hooks, a guide for said first conveyor having means for directing said first conveyor downwardly toward said second conveyor at the entrant end of said spray booth to successively deposit said work holders on said second conveyor and to lower said hooks relative to said work holders, means for driving said first conveyor and for driving said second conveyor at a rate slower than said first conveyor to reduce the spacing between adjacent work holders on said second conveyor and to swing said hooks rearwardly about their pivots as said work holders are deposited on said second conveyor, means for controlling the rate of deceleration of said work holders as they are deposited on said second conveyor comprising a cam positioned for engagement by said hooks as the latter are swung rearwardly about their pivots having a cam surface shaped to reduce the rate of rearward swinging movement of said hooks, and means responsive to continue advance of said hooks by said first conveyor beyond said controlling means for swinging said hooks further in a rearward direction completely out of engagement with said parts of said holders to thereby release said holders from said first conveyor.

6. The work handling apparatus defined in claim 5 in which said second conveyor has anti-friction means on the top surface thereof for supporting said holders.

7. Work handling apparatus comprising first and second conveyors supported one above the other for movement in the same general direction, work holding means movable through the space between said conveyors, means releasably coupling said work holding means to the upper conveyor, means responsive to advancement of said work holding means by said upper conveyor for depositing said work holding means on the lower conveyor, means for driving said upper conveyor and for driving said lower conveyor at a rate of speed slower than that of said upper conveyor, means cooperable with said coupling means for controlling the rate of deceleration of said work holding means from the speed of said upper conveyor to the speed of said lower conveyor following initial deposit of said work holding means on said lower conveyor, and means for disconnecting said coupling means from said work holding means after the aforesaid deceleration of said work holding means.

8. Work handling apparatus comprising an upper conveyor movable along a predetermined path of travel, coupling means depending from said upper conveyor at points spaced lengthwise thereof, work holders having parts respectively engageable with said coupling means, a lower conveyor supported below said upper conveyor for movement along a path of travel which extends in the same general direction as the path of travel of said upper conveyor, anti-friction means on the top surface of said lower conveyor, guide means for relatively moving said conveyors toward each other to deposit said work holders on the anti-friction means of said lower conveyor, means responsive to continued advancement of said coupling means after the deposit of said work holders on the anti-friction means of said lower conveyor for moving said coupling means to a position out of engagement with said work holders to release the latter, means responsive to continued advancement of said coupling means beyond the point of release to return said coupling means to a position engageable with said work holders, means for driving said upper conveyor and for driving said lower conveyor at a rate of speed slower than said upper conveyor enabling said coupling means to overtake the work holders in advance thereof and to engage said work holders and advance the same at the speed of said upper conveyor while supported by said lower conveyor, and guide means located a predetermined distance beyond the point of engagement of said coupling means with said work holders for relatively moving said conveyors apart to transfer said work holders from the lower to the upper conveyor.

9. Work handling apparatus comprising an upper conveyor movable along a predetermined path of travel, hooks pivoted to and depending from said conveyor at points spaced lengthwise thereof and facing in the direction of advancement of said conveyor, work holders having parts respectively engageable with said hooks, a lower conveyor supported below said upper conveyor for movement along a path of travel which extends in the same general direction as the path of travel of said upper conveyor, anti-friction means on the top surface of said lower conveyor, guide means for relatively moving said conveyors toward each other to deposit said work holders on the anti-friction means of said lower conveyor, means responsive to continued advancement of said hooks after the deposit of said work holders on the anti-friction means of said lower conveyor for swinging said hooks out of engagement with said parts to release the latter, means responsive to continued advancement of said hooks beyond the point of release to swing said hooks to a position engageable with said hook-engaging parts, variable drive means for driving said upper conveyor and for driving said lower conveyor at a rate of speed slower than said upper conveyor enabling said hooks to overtake the work holders in advance thereof and engage the hook-engaging parts of said work holders and advance the same at the speed of said upper conveyor while supported by said lower conveyor, and guide means located a predetermined distance beyond the point of engagement of said hooks and hook-engaging parts for relatively moving said conveyors apart to transfer said work holders from the lower to the upper conveyor.

10. The work handling apparatus defined in claim 9 in which said anti-friction means comprises rollers journalled on said lower conveyor with their axes extending transversely thereof.

11. Work handling apparatus comprising a lower conveyor movable along a predetermined path of travel, work holders supported on said lower conveyor in spaced relation lengthwise thereof, means for removing said work holders from said lower conveyor comprising an upper conveyor spaced above said lower conveyor for movement along a path of travel which extends in the same general direction as the path of travel of said lower conveyor and having coupling means depending from said upper conveyor at points spaced lengthwise thereof in positions engageable with said work holders, means for driving said upper conveyor and for driving said lower conveyor at a rate of speed slower than said upper conveyor enabling said coupling means to overtake the work holders in advance thereof and engage said work holders and advance the same at the speed of said upper conveyor while supported by said lower conveyor, and guide means located a predetermined distance beyond the point of engagement of said coupling means with said work holders for relatively moving said conveyors apart to complete the transfer of said work holders from the lower to the upper conveyor, said lower conveyor having anti-friction means on the top surface for supporting said work holders.

12. Work handling apparatus comprising a lower conveyor movable along a predetermined path of travel, work holders supported on said lower conveyor in spaced relation lengthwise thereof and having hook-engaging parts, means for removing said work holders from said lower conveyor comprising an upper conveyor spaced above said lower conveyor for movement along a path of travel which extends in the same general direction as the path of travel of said lower conveyor and having hooks depending from said upper conveyor at points spaced from each other lengthwise thereof, means responsive to advancement of said upper conveyor for successively lowering said hooks to positions engageable with said hook-engaging parts, means for driving said upper conveyor and for driving said lower conveyor at a rate of speed slower than said upper conveyor enabling said hooks to overtake the work holders in advance thereof and engage the hook-engaging parts of said work holders and advance the same at the speed of said upper conveyor while supported by said lower conveyor, and guide means located a predetermined distance beyond the point of engagement of said hooks and hook-engaging parts for relatively moving said conveyors apart to complete the transfer of said work holders from the lower to the upper conveyor.

13. The work handling apparatus defined in claim 12 in which said anti-friction means comprise rollers journalled on said lower conveyor with their axes extending transversely thereof.

14. Work handling apparatus comprising a first conveyor movable along a predetermined path of travel, hooks depending from the conveyor at points spaced from each other lengthwise of the conveyor and facing the direction of advancement of the conveyor, means respectively pivotally mounting the upper ends of the hooks on the conveyor for swinging movement about axes extending transversely of the path of travel of the conveyor, work holders having parts respectively engageable by the hooks, a second conveyor supported below the first conveyor for movement along a path of travel which extends in the same general direction as the path of travel of the first conveyor, guide means for relatively moving said conveyors toward each other to deposit said work holders on said second conveyor and to lower said hooks relative to said work holders, means for driving said first conveyor and for driving said second conveyor at a rate of speed slower than said first conveyor to reduce the spacing between adjacent work holders on said second conveyor and to swing said hooks rearwardly about their pivots as said work holders are deposited on said second conveyor, means cooperable with said hooks for controlling the rate of deceleration of said work holders from the speed of said first conveyor to the speed of said second conveyor following initial deposit of said work holders on said second conveyor, and means responsive to continued advance of said hooks by said first conveyor beyond said controlling means for swinging said hooks further in a rearward direction about their pivots completely out of engagement with said parts of said holders to thereby release said holders from said first conveyor.

15. The work handling apparatus defined in claim 14 in which said controlling means comprises a cam positioned for engagement by said hooks as the latter are swung rearwardly about their pivots following initial deposit of said work holders on said second conveyor, said cam being shaped to reduce the rate of rearward swinging of said hooks to thereby control the deceleration of said work holders.

References Cited in the file of this patent

UNITED STATES PATENTS

| | | |
|---|---|---|
| 801,523 | Hinchman et al. | Oct. 10, 1905 |
| 2,344,155 | McBride et al. | Mar. 14, 1944 |
| 2,651,401 | Vincent | Sept. 8, 1953 |

Notice of Adverse Decision in Interference

In Interference No. 91,030 involving Patent No. 2,816,643, P. Klamp, Work handling conveyor structure, final judgment adverse to the patentee was rendered March 20, 1961, as to claims 1, 3, 4, 7, 8, 9, 10, 11, 12, 13, and 14.

[*Official Gazette May 2, 1961.*]